US012573791B2

(12) United States Patent
Hayashi et al.

(10) Patent No.: US 12,573,791 B2
(45) Date of Patent: Mar. 10, 2026

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tomohiro Hayashi, Mie (JP); Yusuke Yamada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 315 days.

(21) Appl. No.: 18/290,225

(22) PCT Filed: Mar. 30, 2022

(86) PCT No.: PCT/JP2022/016168
§ 371 (c)(1),
(2) Date: Nov. 10, 2023

(87) PCT Pub. No.: WO2022/244518
PCT Pub. Date: Nov. 24, 2022

(65) Prior Publication Data

US 2024/0235104 A1 Jul. 11, 2024

(30) Foreign Application Priority Data

May 18, 2021 (JP) ................................ 2021-084059

(51) Int. Cl.
*H01R 13/58* (2006.01)
*H01R 13/6581* (2011.01)

(52) U.S. Cl.
CPC ..... *H01R 13/5804* (2013.01); *H01R 13/6581* (2013.01)

(58) Field of Classification Search
CPC ............ H01R 13/5804; H01R 13/6581; H01R 13/6592; H01R 13/58; H01R 13/6593;
(Continued)

(56) References Cited

U.S. PATENT DOCUMENTS 4,701,139 A 10/1987 Good et al.
5,831,815 A * 11/1998 Miller ...................... H01R 4/20 361/437
(Continued)

FOREIGN PATENT DOCUMENTS

WO 2007/112771 A1 10/2007

OTHER PUBLICATIONS

International Search Report issued on Jun. 21, 2022 for WO 2022/244518 A1 (4 pages).

*Primary Examiner* — Edwin A. Leon
(74) *Attorney, Agent, or Firm* — Venjuris, P.C.

(57) ABSTRACT

A connector is provided with a connector housing including a wire pull-out opening, a terminal accommodated in the connector housing, a wire connected to the terminal and to be pulled out to outside of the connector housing through the wire pull-out opening, a wire holding portion made of synthetic resin and configured to hold a projecting part of the wire by being externally fit to the projecting part adjacent to the wire pull-out opening and projecting outward through the wire pull-out opening, a shield shell made of metal and configured to cover the connector housing by being fixed to the connector housing, and a wire pressing portion made of metal and to be bolt-fastened to the shield shell while sandwiching the wire holding portion between the shield
(Continued)

shell and the wire pressing portion in a first direction intersecting an axial direction of the wire.

4 Claims, 7 Drawing Sheets

(58) Field of Classification Search
CPC ............... H01R 13/639; H01R 13/516; H01R 13/5208; H01R 13/648; H01R 13/562; H01R 9/0524; H01R 13/508; H01R 9/0518; H01R 9/05
See application file for complete search history.

(56) References Cited

U.S. PATENT DOCUMENTS

| | | | | |
|---|---|---|---|---|
| 9,929,491 | B2 * | 3/2018 | Yamaguchi | H01R 11/12 |
| 2010/0099299 | A1 | 4/2010 | Moriyama et al. | |
| 2011/0207354 | A1 | 8/2011 | Tashiro | |
| 2014/0235092 | A1 * | 8/2014 | Akuta | H01R 13/6272 439/353 |
| 2021/0083407 | A1 | 3/2021 | Blakborn | |

* cited by examiner

CONNECTOR

CROSS REFERENCE TO RELATED APPLICATIONS

This application is a national phase of PCT application No. PCT/JP2022/016168, filed on 30 Mar. 2022, which claims priority from Japanese patent application No. 2021-084059, filed on 18 May 2021, all of which are incorporated herein by reference.

TECHNICAL FIELD

The present disclosure relates to a connector.

BACKGROUND

Conventionally, a connector has been used to electrically connect in-vehicle devices. Such a connector includes a connector housing, a terminal accommodated in the connector housing and a wire connected to the terminal, and the wire is pulled out to outside through a wire pull-out opening of the connector housing. Since an external force such as vibration in a vehicle is applied to the wire pulled out to outside, stress may be applied to a contact point of the terminal and a mating terminal, causing problems such as contact wear, if the external force applied to the wire is transmitted toward the terminal. Accordingly, the transmission of the external force applied to the wire toward the terminal needs to be suppressed in the connector. Thus, a connector disclosed in Patent Document 1 is provided with a rear holder made of resin and to be assembled with a connector housing while holding a wire.

PRIOR ART DOCUMENT

Patent Document

Patent Document 1: JP 2011-054393 A

SUMMARY OF THE INVENTION

Problems to be Solved

In Patent Document 1, the rear holder is assembled by engaging a locking portion in the form of a locking claw provided on the tip of a resilient projecting piece provided in the connector housing with a locked portion when the locking portion rides over the locked portion provided in the rear holder and resiliently returns while being resiliently deformed. Thus, it is unavoidable that a tiny gap is formed between the locking portion and the locked portion and an external force transmitted to the wire may be transmitted toward the terminal due to rattling caused by this gap.

With the use of large currents in in-vehicle devices in recent years, wires have been enlarged in diameter, a rear holder made of resin has had to be enlarged to secure a sufficient holding force to prevent the swing of such large wires, and a problem of being unable to avoid the enlargement of the connector has been inherent. In addition, since the rear holder is made of resin, the rear holder may be deformed by creep under a high-temperature environment and a gap may be formed between the rear holder and the wire to cause rattling.

Accordingly, a connector is disclosed which can suppress or hinder the transmission of an external force applied to a wire toward a terminal by improving a wire holding force while suppressing the enlargement of the connector itself.

Means to Solve the Problem

The present disclosure is directed to a connector with a connector housing including a wire pull-out opening, a terminal accommodated in the connector housing, a wire connected to the terminal, the wire being pulled out to outside of the connector housing through the wire pull-out opening, a wire holding portion made of synthetic resin, the wire holding portion holding a projecting part of the wire by being externally fit to the projecting part adjacent to the wire pull-out opening and projecting outward through the wire pull-out opening, a shield shell made of metal, the shield shell covering the connector housing by being fixed to the connector housing, and a wire pressing portion made of metal, the wire pressing portion being bolt-fastened to the shield shell while sandwiching the wire holding portion between the shield shell and the wire pressing portion in a first direction intersecting an axial direction of the wire.

Effect of the Invention

According to the connector of the present disclosure, it is possible to suppress or hinder the transmission of an external force applied to the wire toward the terminal by improving a wire holding force while suppressing the enlargement of the connector itself.

DETAILED DESCRIPTION TO EXECUTE THE INVENTION

[Description of Embodiments of Present Disclosure]

Figure 1:
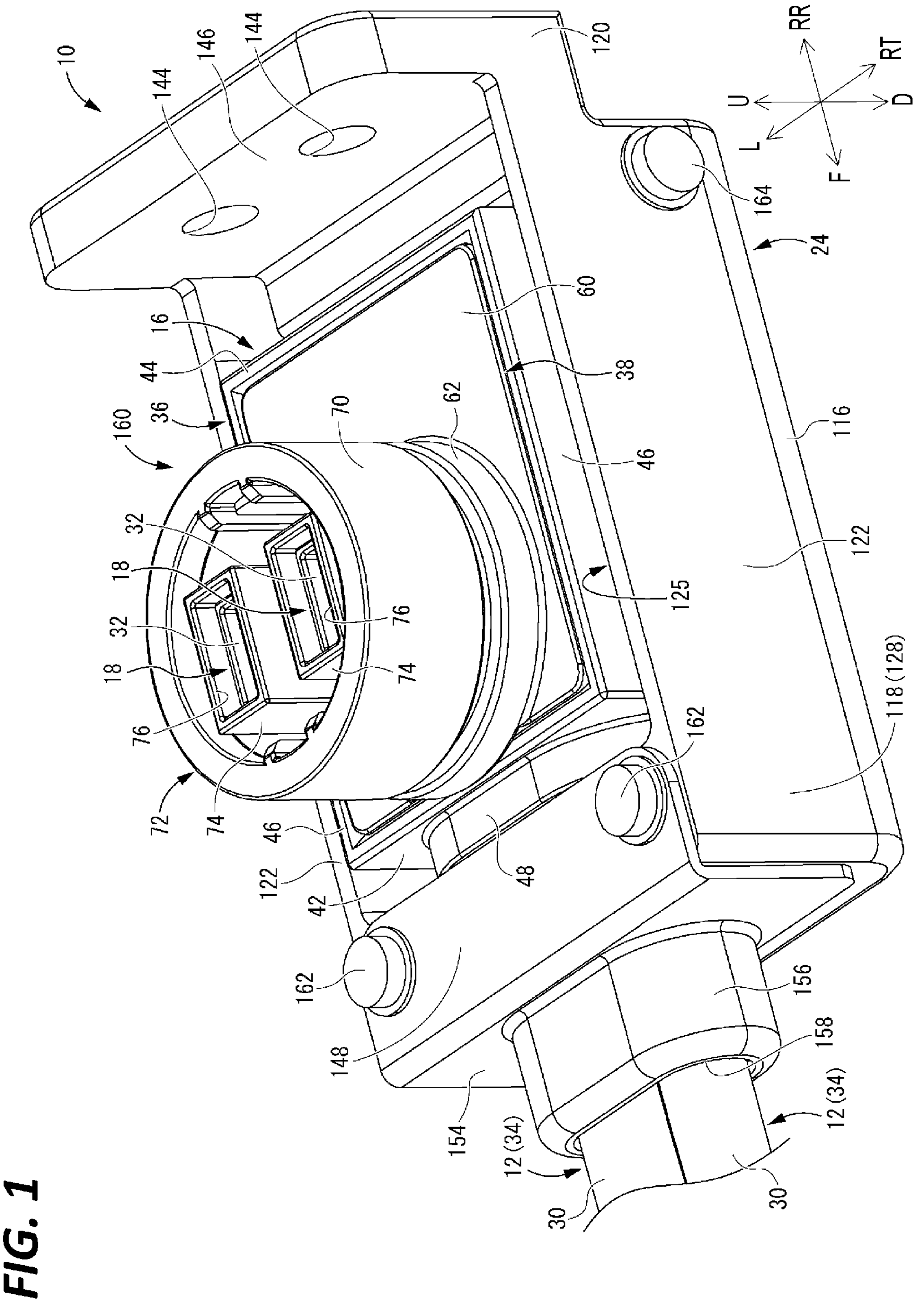
FIG. 1 is a perspective view showing a connector according to one embodiment.

First, embodiments of the present disclosure are listed and described.

(1) The connector of the present disclosure is provided with a connector housing including a wire pull-out opening, a terminal accommodated in the connector housing, a wire connected to the terminal, the wire being pulled out to outside of the connector housing through the wire pull-out opening, a wire holding portion made of synthetic resin, the wire holding portion holding a projecting part of the wire by being externally fit to the projecting part adjacent to the wire pull-out opening and projecting outward through the wire pull-out opening, a shield shell made of metal, the shield shell covering the connector housing by being fixed to the connector housing, and a wire pressing portion made of metal, the wire pressing portion being bolt-fastened to the shield shell while sandwiching the wire holding portion between the shield shell and the wire pressing portion in a first direction intersecting an axial direction of the wire.

According to this configuration, the wire holding portion made of synthetic resin is externally fit to the projecting part of the wire projecting outward through the wire pull-out opening of the connector housing and the wire is first held by the wire holding portion. Further, the connector includes the shield shell made of metal for covering the connector housing by being fixed to the connector housing, and the wire pressing portion made of metal and to be bolt-fastened to the shield shell in the first direction intersecting the axial direction of the wire. The wire holding portion is sandwiched between the shield shell and the wire pressing portion in the first direction intersecting the axial direction of the wire. In this way, also under repeated vibration or high temperatures, a gap is hardly formed between the shield shell and the wire pressing portion and it is possible to continue to press the wire via the wire holding portion. Particularly, since the wire pressing portion is pressed toward the shield shell by an axial force of a bolt, a sufficient holding force for holding the wire holding portion can be ensured between those. Thus, even if the wire is enlarged in diameter, the wire can be fixedly held while a need to enlarge the connector is suppressed. Further, since the wire pulled out to the outside through the wire pull-out opening of the connector housing is sandwiched between the shield shell and the wire pressing portion via the wire holding portion made of synthetic resin, the direct contact of the shield shell and the wire pressing portion made of metal with the wire is suppressed and the damage of the wire and the like can be reduced or avoided.

(2) Preferably, the wire holding portion includes a first holding portion and a second holding portion constituting the wire holding portion by sandwiching and holding the wire from both sides in a direction orthogonal to an axis of the wire and being assembled with each other, a first recess configured to accommodate the wire and contact an outer peripheral surface of the wire is open in a contact surface of the first holding portion with the second holding portion, a second recess configured to accommodate the wire and contact the outer peripheral surface of the wire is open in a contact surface of the second holding portion with the first holding portion, the first and second recesses are connected to configure a wire through hole when the first and second holding portions are assembled, and an outer peripheral surface shape of the wire holding portion is a rectangular shape.

The wire holding portion is divided into the first and second holding portions to be assembled from the both sides in the direction orthogonal to the axis of the wire, and the first recess of the first holding portion and the second recess of the second holding portion are connected to form the wire through hole only by assembling the first and second holding portions across the wire. Thus, the wire holding portion can be easily mounted on the wire pulled out to the outside from the connector housing. Further, since the outer peripheral surface shape of the wire holding portion is a rectangular shape, contact surfaces to be brought into contact with the wire holding portion can be formed to be straight in the shield shell and the wire pressing portion made of metal. As a result, it is possible to provide a connector having an improved wire holding force while suppressing the manufacturing cost of the connector by simplifying the shapes of the shield shell and the wire pressing portion made of metal.

(3) Preferably, the shield shell includes an accommodating portion to be contacted by an outer peripheral surface of the wire holding portion, the wire pressing portion includes a pressing surface for pressing the outer peripheral surface of the wire holding portion toward the accommodating portion in the first direction and a supporting portion for covering the wire holding portion from outside, and the supporting portion includes a wire through hole, the wire being inserted through the wire through hole. Since the shield shell is provided with the accommodating portion to be contacted by the outer peripheral surface of the wire holding portion and the wire pressing portion is provided with the pressing surface for pressing the outer peripheral surface of the wire holding portion toward the accommodating portion in the first direction, the wire pressing portion can be stably sandwiched and held between the accommodating portion of the shield shell and the pressing surface of the wire pressing portion. Further, since the wire pressing portion also includes the supporting portion for covering the wire holding portion from outside, a displacement of the wire pressing portion in a direction coming out from the connector can also be advantageously hindered. In addition, since the supporting portion is provided with the wire through hole, the wire can be easily pulled out to the outside of the connector housing.

(4) Preferably, the pressing surface of the wire pressing portion and a facing surface facing the pressing surface in the first direction in the accommodating portion of the shield shell are flat surfaces, and parts of the outer peripheral surface of the wire holding portion to be brought into contact with the pressing surface and the facing surface facing the pressing surface are flat surfaces extending in parallel to the pressing surface and the facing surface. The pressing surface and the facing surface of the accommodating portion facing the pressing surface in the first direction are both flat surfaces, and the parts of the outer peripheral surface to be brought into contact with the pressing surface and the surface of the accommodating portion facing the pressing surface are formed by flat surfaces extending in parallel to the pressing surface and the facing surface in the wire holding portion interposed between the pressing surface and the facing surface. Therefore, a state of pressing the wire holding portion against the shield shell by the wire pressing portion can be more stably held by stably receiving the axial force of the bolt by the respective surfaces.

<Details of Embodiment of Present Disclosure>

A specific example of a connector of the present disclosure is described below with reference to the drawings. Note that the present disclosure is not limited to these illustrations, but is represented by claims and intended to include all changes in the scope of claims and in the meaning and scope of equivalents.

<Embodiment>

Hereinafter, a connector 10 of one embodiment of the present disclosure is described using FIGS. 1 to 8. The connector 10 is for electrically connecting in-vehicle devices, the in-vehicle device is electrically connected to wires 12 extending in a lower-left direction in FIG. 1 and terminals of the unillustrated mating in-vehicle device are electrically connected to the wires 12 from above in FIG. 1. Note that the connector 10 can be arranged in an arbitrary orientation, but a vertical direction, a lateral direction and a front-rear direction are based on a vertical direction, a lateral direction and a front-rear direction shown in FIG. 1 in the following description. Further, for a plurality of identical members, only some members may be denoted by a reference sign and the other members may not be denoted by the reference sign.

<Connector 10>

The connector 10 of this embodiment includes a connector housing 16 having wire pull-out openings 14 and terminals 18 accommodated in the connector housing 16. The wires 12 are connected to the terminals 18 and pulled out to the outside of the connector housing 16 through the wire pull-out openings 14. Further, the connector 10 is provided with a wire holding portion 22 made of synthetic resin and configured to hold projecting parts 20 of the wires 12 projecting from the connector housing 16, a shield shell 24 made of metal and configured to cover the connector housing 16 by being fixed to the connector housing 16, and a wire pressing portion 26 made of metal and configured to sandwich the wire holding portion 22 between the shield shell 24 and the wire pressing portion 26. Note that, in this embodiment, a pair of the terminals 18, 18 and a pair of the wires 12, 12 are provided, and each wire 12 is connected to each terminal 18.

<Wire 12>

Figure 4:
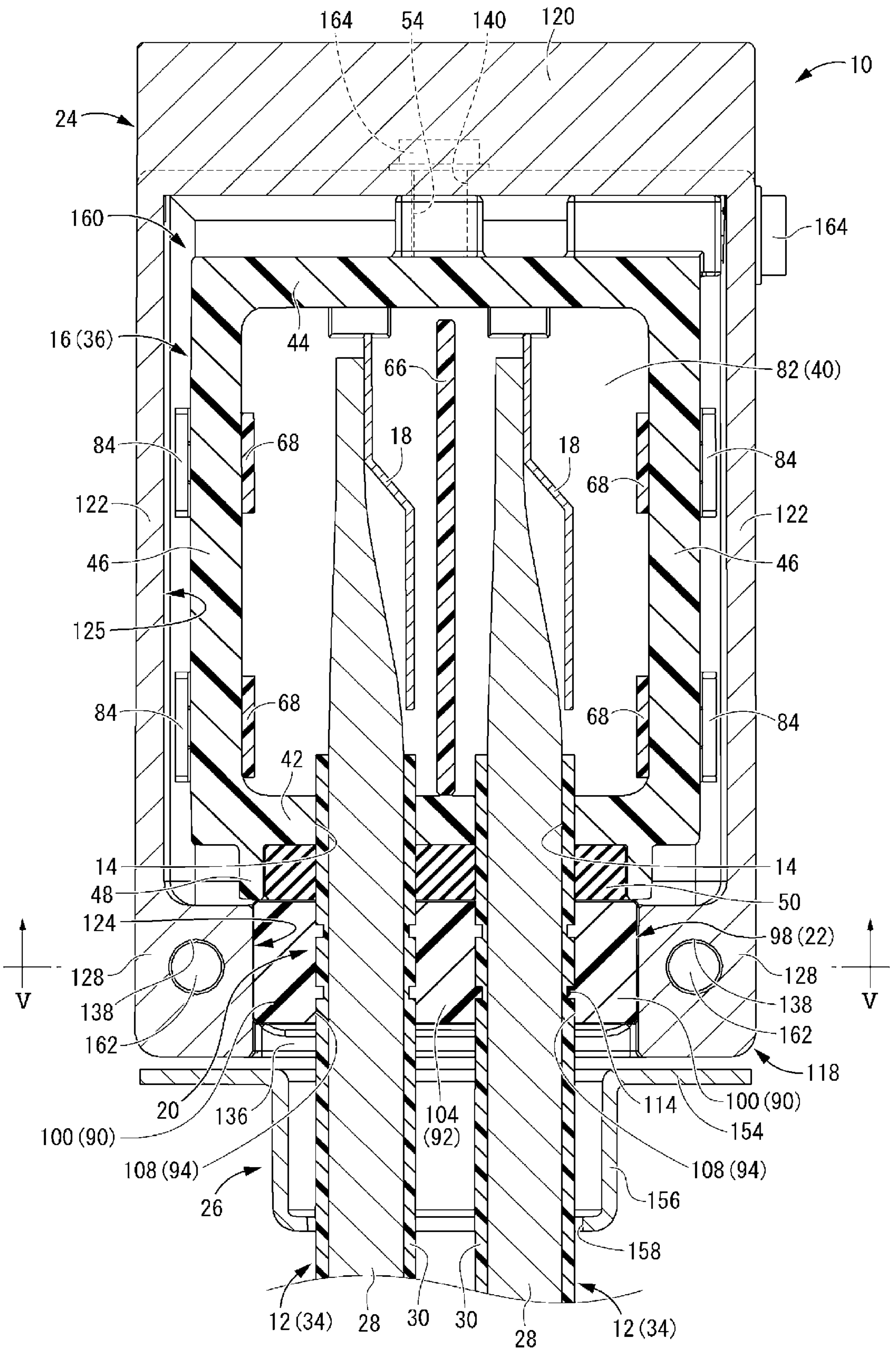
FIG. 4 is a vertical section along IV-IV in FIG. 5 of the connector shown in FIG. 1.
Figure 5:
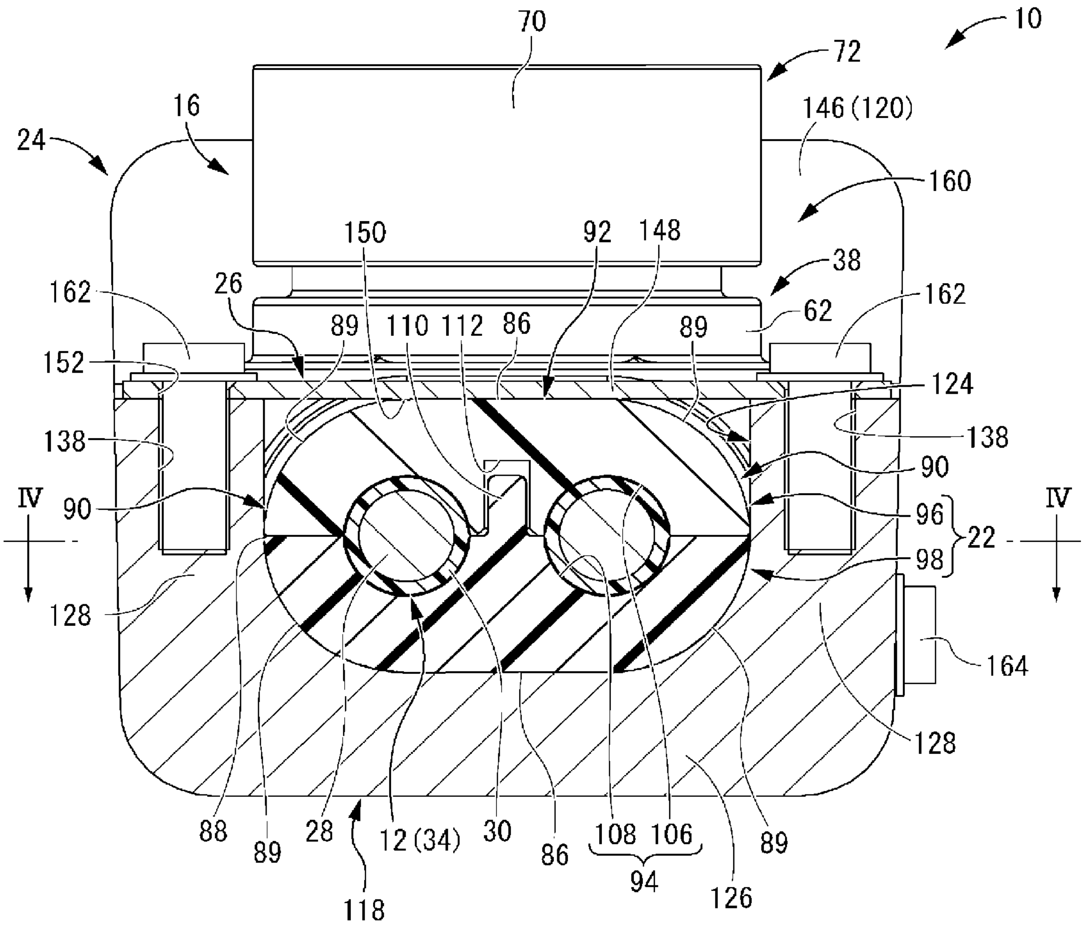
FIG. 5 is a vertical section along V-V in FIG. 4.

As also shown in FIG. 4, the wire 12 is a coated wire. That is, the wire 12 is configured by covering a core wire 28 with an insulation coating 30 made of synthetic resin. The insulation coating 30 is stripped at a rear end part of wire 12 to expose the core wire 28. The terminal 18 is fixed to this exposed core wire 28 such as by welding, whereby the wire 12 is electrically connected to the terminal 18.

<Terminal 18>

The terminal 18 is made of metal and includes a part having a flat plate shape extending in the front-rear direction. A rear end part of the terminal 18 has a part having a large plate width (vertical dimension), and the core wire 28 exposed at the rear end part of the wire 12 is fixed to this part having the large plate width. Further, a contact point portion 32 having a substantially tubular shape projects upward from a front end part of the part having the flat plate shape. The tab-shaped terminal of the mating in-vehicle device is assembled with this contact point portion 32 and the contact point portion 32 and the terminal are brought into contact with each other, whereby the terminal 18 of the connector 10 and the terminal of the mating in-vehicle device are electrically connected. In this embodiment, a harness assembly 34 is configured by fixing the terminal 18 to the rear end part of the wire 12, and a pair of the harness assemblies 34, 34 are arranged side by side in the lateral direction.

<Connector Housing 16>

Figure 3:
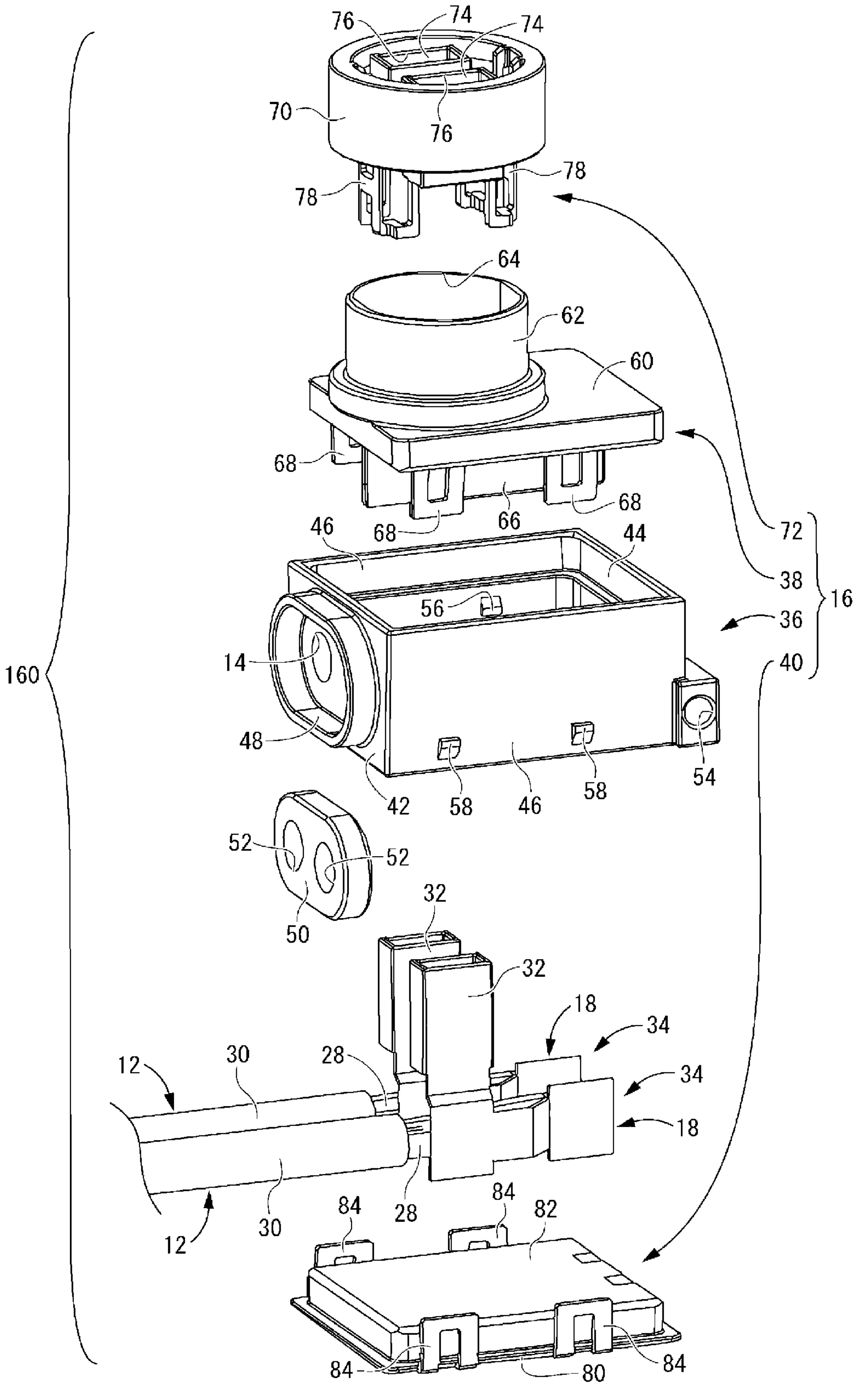
FIG. 3 is an exploded perspective view of a connector body constituting the connector shown in FIG. 1.

The connector housing 16 is formed of insulating synthetic resin. The connector housing 16 of this embodiment is composed of a plurality of members as also shown in FIG. 3 and provided with a substantially tubular housing body 36 open in the vertical direction, a housing lid portion 38 for covering an upper opening of the housing body 36 and a housing bottom portion 40 for covering a lower opening of the housing body 36.

The housing body 36 has a substantially rectangular tube shape and has a front wall 42, a rear wall 44 and side walls 46, 46 on both left and right sides. These walls 42, 44, 46 and 46 extend in the vertical direction. The front wall 42 is formed with the circular wire pull-out openings 14 penetrating in a thickness direction (front-rear direction). Since the pair of wires 12, 12 are provided in this embodiment, a pair of the wire pull-out openings 14, 14 are formed side by side in the lateral direction in the front wall 42. Further, the front wall 42 is provided with an accommodating tube portion 48 projecting forward, and the pair of wire pull-out openings 14, 14 are covered from outside by this accommodating tube portion 48. The accommodating tube portion 48 has an outer shape long in the lateral direction, and the outer shape is a substantially rectangular shape with rounded corners or substantially elliptical shape.

A waterproof rubber 50 made of a resilient material such as rubber is accommodated into this accommodating tube portion 48. The waterproof rubber 50 has a shape substantially corresponding to the accommodating tube portion 48 and is formed with insertion holes 52, 52 penetrating in a thickness direction at positions corresponding to the wire pull-out openings 14, 14 in the front wall 42. The waterproof rubber 50 is formed to be slightly larger than the accommodating tube portion 48, and mounted into the accommodating tube portion 48 in a substantially compressed state when the connector 10 is assembled. In this way, water intrusion into the connector housing 16 through the wire pull-out openings 14 is prevented.

The rear wall 44 is provided with bolt holes 54, with which bolts 164 to be described later are threadably engaged, when the shield shell 24 is fixed to the connector housing 16. In this embodiment, as also shown in FIGS. 3 and 4, two bolt holes 54, 54 are provided in the rear wall 44 and respectively open rearward and rightward. Further, engaging protrusions 56 to be engaged with engaging frame bodies 68 of the housing lid portion 38 to be described later when the housing lid portion 38 is assembled are provided on the inner surface of each side wall 46. Further, engaging protrusions 58 to be engaged with engaging frame bodies 84 of the housing bottom portion 40 to be described when the housing bottom portion 40 is assembled are provided on the outer surface of each side wall 46.

The housing lid portion 38 includes a lid plate portion 60 extending in a perpendicular direction (direction orthogonal to the vertical direction), and the lid plate portion 60 is formed in such a size that the upper opening of the housing body 36 can be covered. In this embodiment, the lid plate portion 60 enters the housing body 36 when the housing lid portion 38 is assembled with the housing body 36. The lid plate portion 60 is formed with an unillustrated through hole penetrating in a thickness direction (vertical direction), and a tubular portion 62 having a substantially tubular shape and projecting upward is formed on an outer peripheral edge part of this through hole. In short, an inner hole of the tubular portion 62 extending in the vertical direction and the through hole provided in the lid plate portion 60 communicate with each other and a communication hole 64 penetrating through the tubular portion 62 and the lid plate portion 60 in the vertical direction is formed. Unillustrated engaging protrusions are provided on the inner surface of the communication hole 64, and engaging frame bodies 78 of the tubular housing 72 to be described later can be engaged with the engaging protrusions.

A partition wall portion 66 projecting downward is provided in a lateral center of the lid plate portion 60 and has a predetermined dimension in the front-rear direction. In this way, the inside of the housing body 36 is partitioned in the lateral direction by the partition wall portion 66 when the housing lid portion 38 is assembled with the housing body 36. Since the respective terminals 18 are disposed on both left and right sides of the partition wall portion 66 in the housing body 36, the mutual contact of the respective terminals 18 is prevented by the partition wall portion 66. Further, the engaging frame bodies 68 projecting downward are provided on both lateral sides of the lid plate portion 60.

The tubular housing 72 having a substantially tubular peripheral wall 70 is assembled with the tubular portion 62 of the housing lid portion 38. The tubular housing 72 includes holding tube portions 74 substantially in the form of rectangular tubes extending in the vertical direction on an inner peripheral side of the peripheral wall 70, and the contact point portions 32 of the terminals 18 are inserted and held in the holding tube portions 74 when the connector 10 is assembled. Since the pair of terminals 18, 18 are provided in this embodiment, a pair of the holding tube portions 74, 74 are provided side by side in the lateral direction in the tubular portion 72. Since the terminals of the mating in-vehicle device are assembled with the contact point portions 32 held in this holding tube portion 74 from above, an upper opening of the holding tube portion 74 serves as a terminal assembly opening 76, through which the mating terminals are assembled. Further, the tubular housing 72 includes the engaging frame bodies 78 projecting downward.

The housing bottom portion 40 includes a bottom plate portion 80 extending in the perpendicular direction, and the bottom plate portion 80 is formed in such a size that the lower opening of the housing body 36 can be covered. An inserting portion 82 projecting upward is provided on the bottom plate portion 80. In this way, when the housing bottom portion 40 is assembled with the housing body 36, the inserting portion 82 enters the housing body 36 and an outer peripheral edge part of the bottom plate portion 80 is overlapped on the lower end of the peripheral wall (respective walls 42, 44, 46 and 46) of the housing body 36. Further, the engaging frame bodies 84 projecting upward are provided on both side edge parts in the lateral direction of the bottom plate portion 80.

<Wire Holding Portion 22>

The wire holding portion 22 of this embodiment holds the wires 12, 12 adjacent in the lateral direction. The wire holding portion 22 has a predetermined dimension in a length direction (front-rear direction) of the wires 12, and the outer peripheral surface shape (cross-sectional shape shown in FIG. 5) of the wire holding portion 22 is a rectangular shape long in the lateral direction. Particularly, in this embodiment, the outer peripheral surface shape of the wire holding portion 22 is a substantially rectangular shape with rounded corners or substantially elliptical shape. Thus, in this embodiment, flat surfaces 86, 86 extending in the perpendicular direction are provided on both vertical sides and flat surfaces 88, 88 extending in the vertical direction are provided on both lateral sides on the outer peripheral surface of the wire holding portion 22. The flat surface 86 extending in the perpendicular direction has a predetermined lateral dimension, and the flat surface 88 extending in the vertical direction has a predetermined vertical dimension. Note that the lateral dimension of the flat surface 86 and the vertical dimension of the flat surface 88 may be substantially zero, and the outer peripheral surface shape of the wire holding portion may be, for example, an elliptical shape. Any of parts connecting the upper or lower flat surface 86 and the left or right flat surface 88 on the outer peripheral surface of the wire holding portion 22 is a curved surface 89.

The wire holding portion 22 includes tubular parts 90, 90 surrounding the respective wires 12, 12 on both lateral sides. These tubular parts 90, 90 adjacent in the lateral direction are coupled to each other by a coupling part 92 in a laterally central part. That is, inner holes of the tubular parts 90, 90 are the wire through holes 94, 94, through which the wires 12, 12 are disposed, and penetrate through the wire holding portion 22 in the front-rear direction. In this embodiment, each of the both tubular parts 90, 90 has a hollow cylindrical shape.

<First Holding Portion 96 and Second Holding Portion 98>

Figure 2:
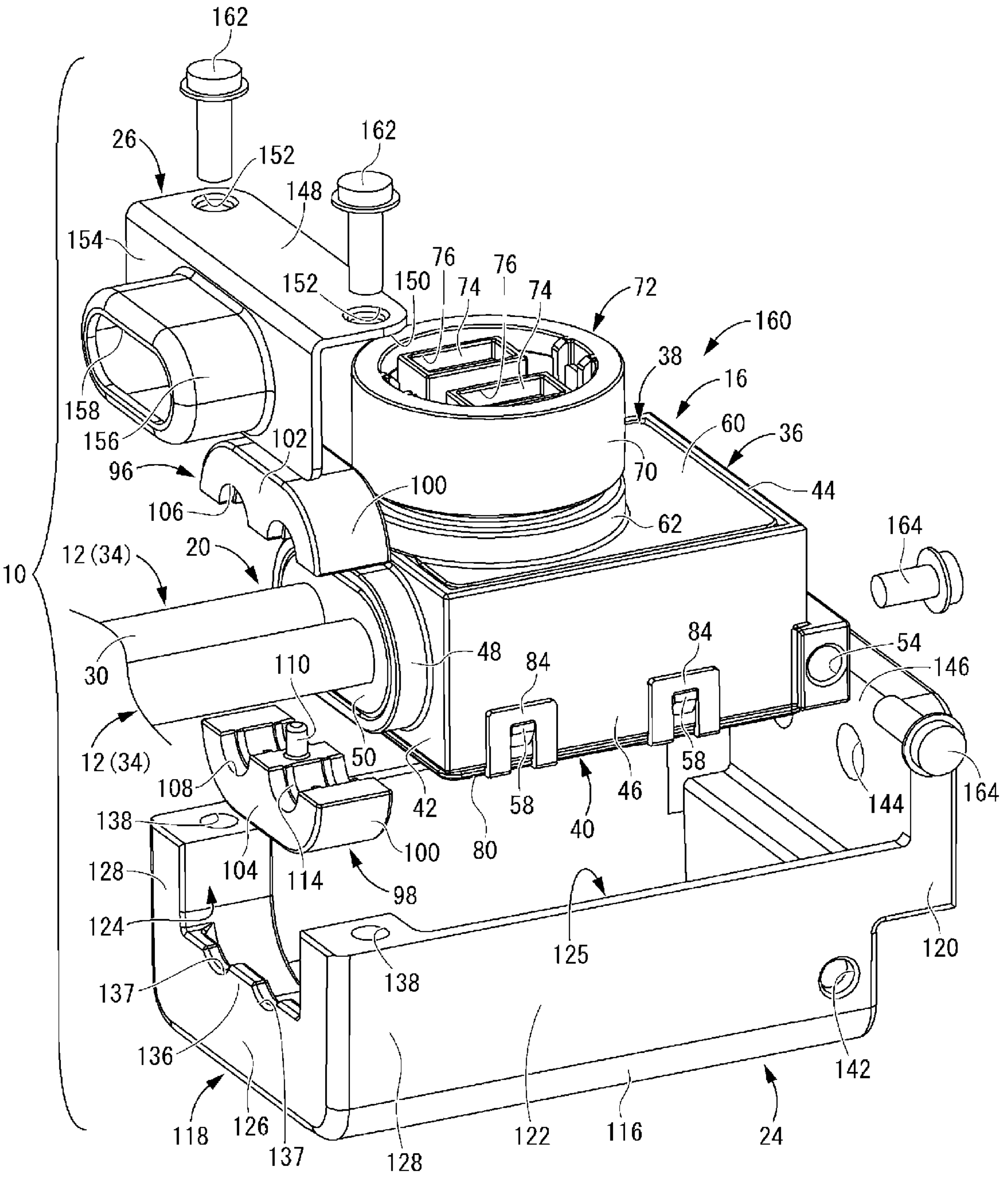
FIG. 2 is an exploded perspective view of the connector shown in FIG. 1.

As also shown in FIG. 2, the wire holding portion 22 of this embodiment is composed of a plurality of members and includes a first holding portion 96 located above and a second holding portion 98 located below. The first and second holding portions 96, 98 are assembled with each other while sandwiching and holding the wires 12 from both sides in a direction orthogonal to the axes of the wires 12 (both vertical sides).

Figure 6:
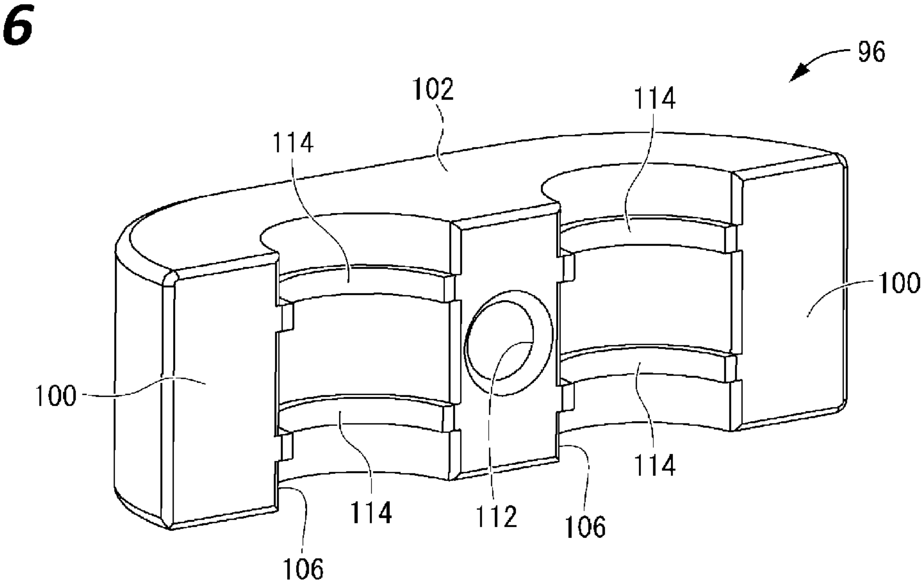
FIG. 6 is a perspective view showing a first holding portion constituting the connector shown in FIG. 1.
Figure 7:
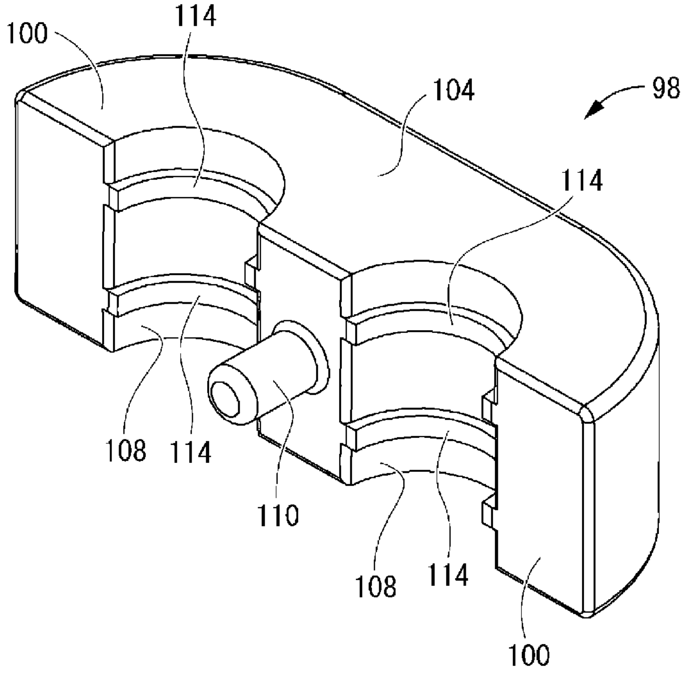
FIG. 7 is a perspective view showing a second holding portion constituting the connector shown in FIG. 1.

That is, as also shown in FIGS. 6 and 7, halved tubular portions 100, 100 constituting the tubular parts 90 by being overlapped in the vertical direction are provided on both lateral sides of the first and second holding portions 96, 98. Further, an upper coupling portion 102 and a lower coupling portion 104 constituting the coupling part 92 by being overlapped in the vertical direction are provided in lateral centers of the first and second holding portions 96, 98. The halved tubular portions 100, 100 on the both lateral sides in the first holding portion 96 are coupled by the upper coupling portion 102, and the halved tubular portions 100, 100 on the both lateral sides in the second holding portion 98 are coupled by the lower coupling portion 104.

Accordingly, the flat surfaces 88, 88 on the both lateral sides in the wire holding portion 22 are configured by overlapping circumferential end parts of the halved tubular portions 100 in the vertical direction on the outer peripheral surfaces of the first and second holding portions 96, 98. Further, the outer peripheral surfaces of the upper and lower coupling portions 102, 104 are the flat surfaces 86, 86 on the both vertical sides in the wire holding portion 22.

In the first holding portion 96, first recesses 106 to be brought into contact of the outer peripheral surfaces of the wires 12 accommodated thereinto are open in a lower surface serving as a contact surface with the second holding portion 98. Further, in the second holding portion 98, second recesses 108 to be brought into contact of the outer peripheral surfaces of the wires 12 accommodated thereinto are open in an upper surface serving as a contact surface with the first holding portion 96. In short, in the first and second holding portions 96, 98, the inner holes of the halved tubular portions 100 are respectively the first recesses 106 and the second recesses 108. In this embodiment, a pair of the first recesses 106 and a pair of the second recesses 108 are respectively provided on the both lateral sides of the first and second holding portions 96, 98. When the first and second holding portions 96, 98 are assembled, these first recesses 106 and second recesses 108 are connected to configure the wire through holes 94.

A fitting protrusion 110 and a fitting hole 112 to be fit to each other when the first and second holding portions 96, 98 are assembled are provided on overlapping surfaces of the first and second holding portions 96, 98. In this embodiment, the fitting hole 112 open toward the second holding portion 98 is provided in the first holding portion 96, and the fitting protrusion 110 projecting toward the first holding portion 98 is provided on the second holding portion 98. Note that the fitting protrusion 110 may be inserted substantially in a press-fit state into the fitting hole 112 or may be inserted with a tiny gap therebetween.

Press-contact ribs 114 projecting toward an inner peripheral side are provided on the inner peripheral surfaces of the first and second recesses 106, 108. In this embodiment, a plurality of the press-contact ribs 114 are provided apart from each other in an axial direction of the wire 12 in the first and second recesses 106, 108, and the respective press-contact ribs 114 are provided substantially over the entire lengths of the first and second recesses 106, 108 in a circumferential direction. The press-contact ribs 114 in the first recesses 106 and the press-contact ribs 114 in the second recesses 108 are formed substantially the same positions in the front-rear direction. In this way, substantially annular press-contact ribs are formed on the inner peripheral surfaces of the wire through holes 94 when the first and second holding portions 96, 98 are assembled. By providing such press-contact ribs 114, the press-contact ribs 114 bite into the insulation coatings 30 of the respective wires 12 at the time of assembling the connector 10, whereby a holding force of the wire holding portion 22 for holding the respective wires 12 can be improved.

<Shield Shell 24>

Figure 8:
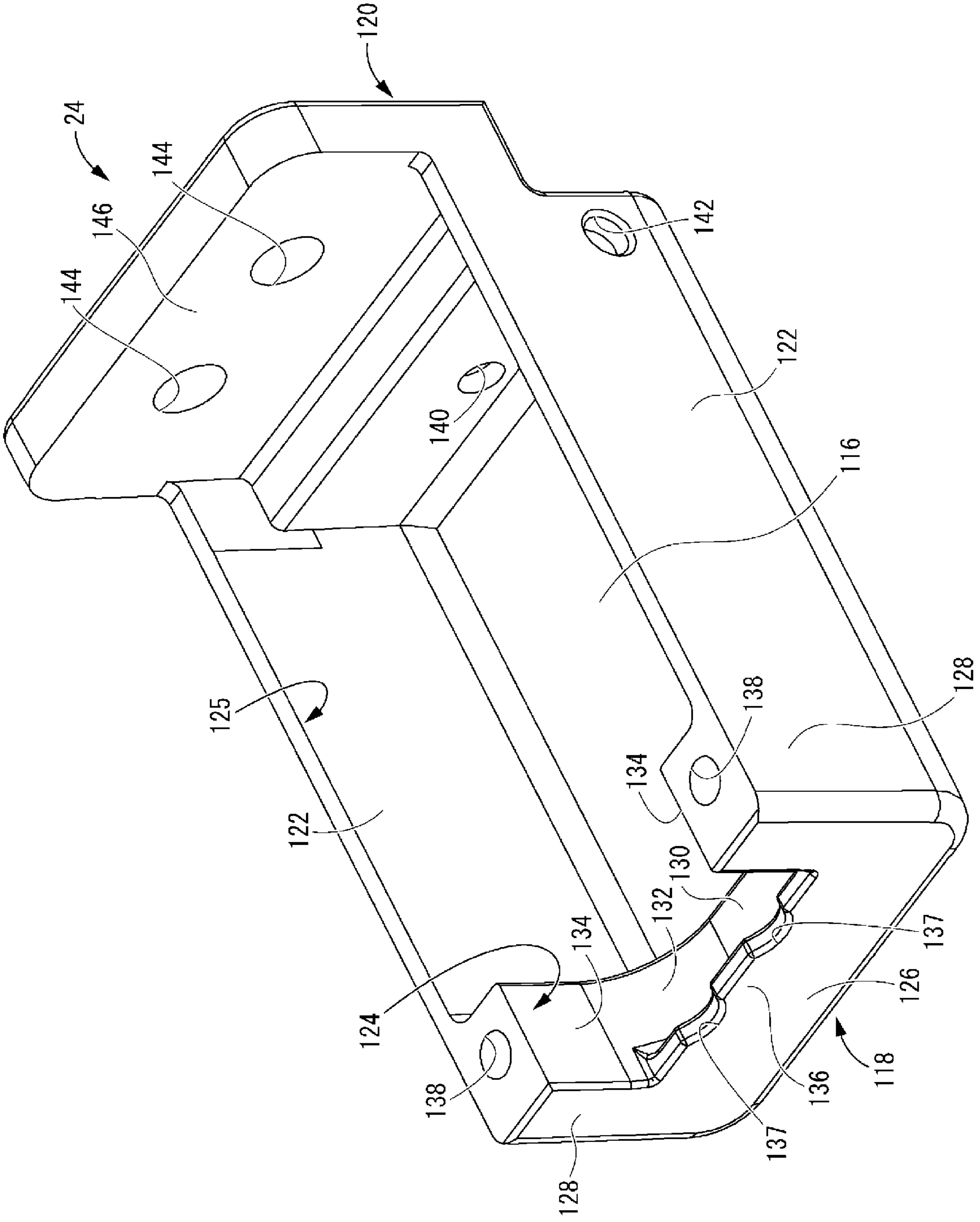
FIG. 8 is a perspective view showing a shield shell constituting the connector shown in FIG. 1.

As also shown in FIG. 8, the shield shell 24 has a substantially box shape open upward as a whole and is provided with a substantially rectangular bottom wall portion 116, and a front wall portion 118 on a front side, a rear wall portion 120 on a rear side and a pair of side wall portions 122, 122 on both left and right sides projecting upward from an outer peripheral edge part of the bottom wall portion 116. The front wall portion 118 has a predetermined dimension in the front-rear direction and has a larger thickness than the rear wall portion 120 and the side wall portions 122. An accommodating portion 124 for accommodating the wire holding portion 22 is provided to be open upward and penetrate through the front wall portion 118 in the front-rear direction. That is, as described later, the connector housing 16 is accommodated into a connector housing recess 125, which is a region surrounded by the respective wall portions 116, 118, 120, 122 and 122 in the shield shell 24, and the wire holding portion 22 provided in front of the connector housing 16 is accommodated into the accommodating portion 124.

By providing the accommodating portion 124, the front wall portion 118 is substantially U-shaped when viewed from the front-rear direction. That is, the front wall portion 118 includes a bottom part 126 and a pair of side parts 128, 128 projecting substantially straight upward from both lateral sides of the bottom part 126. The inner peripheral surface of the accommodating portion 124 partially contacts the outer peripheral surface of the wire holding portion 22. That is, a laterally central part of the inner peripheral surface of the accommodating portion 124, i.e. the upper surface of the bottom part 126, is a flat surface 130 substantially corresponding to the lower flat surface 86 of the outer peripheral surface of the wire holding portion 22. This flat surface 130 is a facing surface facing a pressing surface 150 of the wire pressing portion 26 in the vertical direction (first direction to be described later) during the assembling of the shield shell 24 and the wire pressing portion 26 to be described later. The flat surface 130 and the lower flat surface 86 of the outer peripheral surface of the wire holding portion 22 extend in parallel to each other, and the flat surface 130 and the lower flat surface 86 contact each other when the wire holding portion 22 is accommodated into the accommodating portion 124.

Further, on the inner peripheral surface of the accommodating portion 124, both lateral sides of the flat surface 130, i.e. parts extending from the bottom part 126 to the side parts 128, 128, are curved surfaces 132, 132 substantially corresponding to the outer peripheral surfaces (curved surfaces 89) of the halved tubular portions 100, 100 in the wire holding portion 22. In this way, when the wire holding portion 22 is accommodated into the accommodating portion 124, the curved surfaces 132, 132 and the lower curved surfaces 89, 89 in the wire holding portion 22 contact each other. On the inner peripheral surface of the accommodating portion 124, parts above the curved surfaces 132, 132 are vertical surfaces 134, 134 constituted by the laterally inner surfaces of the side parts 128, 128 and extending in the vertical direction. In this way, when the wire holding portion 22 is accommodated into the accommodating portion 124, the vertical surfaces 134, 134 and the flat surfaces 88, 88 extending in the vertical direction on the both left and right sides of the wire holding portion 22 contact each other.

Note that a retaining wall portion 136 projecting upward from the bottom part 126 is provided in front of the accommodating portion 124 on the inner surface of the front wall portion 118. The detachment of the wire holding portion 22 accommodated in the accommodating portion 124 is suppressed by this retaining wall portion 136. Recesses 137 corresponding to the outer peripheral surfaces of the respective wires 12 are formed on the upper end surface of the retaining wall portion 136.

Bolt holes 138, 138, with which bolts 162, 162 to be described later are threadably engaged, are formed in the upper end surfaces of the side parts 128, 128 on the both left and right sides of the front wall portion 118. In the rear wall portion 120, a bolt hole 140 penetrating in a thickness direction (front-rear direction) is formed at a position corresponding to the rear bolt hole 54 of the connector housing 16. In the right side wall portion 122, a bolt hole 142 penetrating in a thickness direction (lateral direction) is formed at a position corresponding to the right bolt hole 54 of the connector housing 16. Further, an upper part of the rear wall portion 120 is provided with an external connecting portion 146 including bolt insertion holes 144. That is, the shield shell 24 and external wires or the like can be electrically connected by placing terminal portions provided on ends of the external wires or the like on the external connecting portion 146 and inserting and tightening unillustrated bolts into the bolt insertion holes 144.

<Wire Pressing Portion 26>

The wire pressing portion 26 is a member to be bolt-fastened to the shield shell 24 while sandwiching the wire holding portion 22 between the shield shell 24 and the wire pressing portion 26 in the first direction, which is a direction intersecting the axial direction (front-rear direction) of the wires 12. In this embodiment, the wire pressing portion 26 is bolt-fastened to the shield shell 24 with the wire pressing portion 26 overlapped on the wire holding portion 22 accommodated in the accommodating portion 124 of the shield shell 24 from above. That is, in this embodiment, the first direction, in which the wire pressing portion 26 is bolt-fastened to the shield shell 24 while sandwiching the wire holding portion 22 between the shield shell 24 and the wire pressing portion 26 is the vertical direction.

As also shown in FIG. 2, the wire pressing portion 26 includes a pressing wall portion 148 for covering and pressing the wire holding portion 22 from above. The lower surface of the pressing wall portion 148 is the pressing surface 150 for pressing the wire holding portion 22 toward the accommodating portion 124 located below in the first direction (vertical direction). The pressing surface 150 is a flat surface substantially corresponding to the upper flat surface 86 in the wire holding portion 22. That is, the pressing surface 150 and the upper flat surface 86 on the outer peripheral surface of the wire holding portion 22 extend in parallel to each other, and the pressing surface 150 and the upper flat surface 86 contact each other when the wire pressing portion 26 is fixed to the shield shell 24. The pressing wall portion 148 has a substantially rectangular shape in a plan view, and bolt insertion holes 152, 152 penetrating in the vertical direction are formed on both lateral sides of the pressing wall portion 148.

A supporting portion 154 for covering the front wall portion 118 from front when the wire pressing portion 26 is fixed to the shield shell 24 is provided on a front end part of the pressing wall portion 148. That is, when the wire pressing portion 26 is fixed to the shield shell 24, the wire holding portion 22 is covered from outside (front) by the supporting portion 154. This supporting portion 154 is provided with a tubular portion 156 projecting forward, and the inner hole of the tubular portion 156 penetrates through the supporting portion 154 and is open on both sides in the front-rear direction. A wire insertion hole 158, through which the wires 12 are inserted when the connector 10, is assembled is constituted by the inner hole of this tubular portion 156.

<Assembling Method of Connector 10>

An example of a specific assembling method of the connector 10 is described below. Note that the assembling method of the connector 10 is not limited to the one described below.

First, the respective wires 12 and the respective terminals 18 are prepared. After the insulation coating 30 of each wire 12 is stripped to expose the core wire 28, the terminal 18 is fixed to the exposed core wire 28. In this way, each harness assembly 34 is formed.

Thereafter, with each harness assembly 34 set in a molding cavity for the housing body 36, a resin material is filled into the molding cavity to mold the housing body 36, whereby the housing body 36 having each harness assembly 34 fixed thereto is obtained. In this way, the terminal 18 of each harness assembly 34 is accommodated in the housing body 36 and each wire 12 is caused to project outward through the wire pull-out opening 14 of the housing body 36. Note that the housing body 36 may be molded in advance, and the housing body 36 and the respective wires 12 may be fixed with the terminals 18 accommodated in the housing body 36 by inserting the respective wires 12 through the wire pull-out openings 14 of the housing body 36. In this state, the contact point portion 32 of each terminal 18 projects upward from the housing body 36. Subsequently, the housing lid portion 38 and the housing bottom portion 40 prepared in advance are assembled with this housing body 36. That is, the housing lid portion 38 is assembled with the housing body 36 by engaging each engaging protrusion 56 and each engaging frame body 68. Further, the housing bottom portion 40 is assembled with the housing body 36 by engaging each engaging protrusion 58 and each engaging frame body 84. Note that water intrusion into the connector housing 16 may be prevented, for example, by providing appropriate sealing members between the respective members when the housing lid portion 38 and the housing bottom portion 40 are assembled with the housing body 36.

By assembling the housing lid portion 38 with the housing body 36, the contact point portion 32 of each terminal 18 is inserted into the tubular portion 62 (communication hole 64) of the housing lid portion 38. Thereafter, the tubular housing 72 is assembled with the housing lid portion 38. That is, each unillustrated engaging protrusion provided on the inner surface of the communication hole 64 and each engaging frame body 78 are engaged. In this way, each contact point portion 32 is held in each holding tube portion 74.

Further, each wire 12 is inserted through each insertion hole 52 of the waterproof rubber 50, and the waterproof rubber 50 is accommodated into the accommodating tube portion 48 of the housing body 36. In this way, a connector body 160 (see FIG. 2 and the like) is obtained in which each harness assembly 34 is fixed to the connector housing 16. In the connector housing 160, each terminal 18 is accommodated in the connector housing 16 and each wire 12 is pulled out forward from each wire pull-out opening 14. The part of each wire 12 projecting forward (outward) from the connector housing 16, particularly a part adjacent to the wire pull-out opening 14 (waterproof rubber 50), is the projecting part 20.

By assembling the first and second holding portions 96, 98 with these projecting parts 20 from both vertical sides, the wire holding portion 22 is externally fit to the projecting parts 20. At that time, the fitting protrusion 110 may be inserted substantially in a press-fit state into the fitting hole 112 to prevent the first and second holding portions 96, 98 from being accidentally disassembled. Then, the shield shell 24 is fixed to the connector body 160 having the wire holding portion 22 assembled therewith. Specifically, the connector housing 16 is accommodated into the connector housing recess 125 of the shield shell 24 and the wire holding portion 22 is accommodated into the accommodating portion 124. Then, the part of each wire 12 projecting forward from the wire holding portion 22 is arranged on each recess 137 provided in the retaining wall portion 136. Thereafter, the tubular portion 156 of the wire pressing portion 26 is externally fit to the respective wires 12 from front, and the bolt insertion holes 152 of the wire pressing portion 26 and the bolt holes 138 in the respective side parts 128 of the front wall portion 118 are aligned with each other. By inserting and tightening the bolts 162 into these bolt insertion holes 152 and bolt holes 138, the wire pressing portion 26 is bolted and fixed to the shield shell 24 with the wire holding portion 22 sandwiched between the wire pressing portion 26 and the shield shell 24.

Further, the bolt hole 54 open rightward in the connector housing 16 and the bolt hole 142 provided in the right side wall portion 122 of the shield shell 24 are aligned, and the bolt 164 is inserted and tightened into the aligned holes. Furthermore, the bolt hole 54 open rearward in the connector housing 16 and the bolt hole 140 provided in the rear wall portion 120 of the shield shell 24 are aligned, and the bolt 164 is inserted and tightened into the aligned holes. In this way, the connector housing 16 and the shield shell 24 are fixed. As a result, the connector 10 of this embodiment is completed.

Note that the first and second holding portions 96, 98 may be assembled with a certain gap present between the fitting protrusion 110 and the fitting hole 112. That is, in assembling the connector 10, the connector housing 16 may be accommodated into the connector housing recess 125 and, thereafter, the first holding portion 96 may be overlapped on the projecting parts of the respective wires 12 from above and the wire pressing portion 26 may be fixed to the shield shell 24 from above the first holding portion 96 by bolt tightening after the second holding portion 98 is placed on the accommodating portion 124 of the shield shell 24.

In the connector 10 of this embodiment, the projecting parts 20 of the respective wires 12 projecting from the connector housing 16 are held by the wire holding portion 22 made of synthetic resin. This wire holding portion 22 is sandwiched from the both vertical sides by the shield shell 24 and the wire pressing portion 26 both made of metal. Particularly, since the wire pressing portion 26 is fixed to the shield shell 24 by bolt tightening, the wire holding portion 22 is pressed in the vertical direction by the wire pressing portion 26 using a tightening force of the bolt. In this way, even if vibration is repeatedly input or when the connector is exposed to a high temperature for a long period of time, a sufficient holding force for the wires 12 can be obtained by preventing a gap from being formed between the wire holding portion 22 and the respective wires 12. As a result, the transmission of an external force applied to the wires 12 toward the terminals 18 is suppressed or hindered. Further, even if wires are enlarged in diameter, it is not necessary to obtain a holding force, for example, by enlarging a wire holding portion and the enlargement of an entire connector is also suppressed. Furthermore, since the parts (projecting parts 20) of the respective wires 12 adjacent to the connector housing 16 are held by the wire holding portion 22 made of synthetic resin, the damage of the wires 12 and the like are suppressed, for example, as compared to the case where these parts are held by a member made of metal.

The wire holding portion 22 has a vertically divided structure and the wire holding portion 22 is assembled with the respective wires 12 by sandwiching and fixing the respective wires 12 by the first and second holding portions 96, 98 in the vertical direction. Further, the wire holding portion 22 has a substantially rectangular shape with rounded corners or substantially elliptical shape, and has the flat surfaces 86, 88 on both vertical sides and both lateral sides. In this way, the wire holding portion 22 can contact the pressing surface 150 of the wire pressing portion 26 with a wide contact area and a pressing force by the wire pressing portion 26 can be efficiently applied.

The front wall portion 118 of the shield shell 24 is provided with the accommodating portion 124 for accommodating the wire holding portion 22. In this way, the wire holding portion 22 can be sandwiched between the pressing surface 150 of the wire pressing portion 26 and the accommodating portion 124. Further, since the wire holding portion 22 accommodated in the accommodating portion 124 is covered from outside (front) by the supporting portion 154 of the wire pressing portion 26, forward detachment of the wire holding portion 22 from the shield shell 24 is prevented.

In the accommodating portion 124, the facing surface facing the pressing surface 150 of the wire pressing portion 26 in the first direction (vertical direction) is the flat surface 130, and contacts the lower flat surface 86 of the wire holding portion 22 when the wire holding portion 22 is accommodated into the accommodating portion 124. By forming the facing surface of the accommodating portion 124 facing the pressing surface 150 into the flat surface 130 in this way, the flat surfaces 86, 86 on the both vertical sides of the wire holding portion 22 having a substantially rectangular shape with rounded corners or substantially elliptical shape can be brought into contact with the pressing surface 150 and the flat surface 130, which are both flat surfaces. In this way, the wire holding portion 22 can be more stably sandwiched between the wire pressing portion 26 and the shield shell 24, and the formation of a gap between the wire holding portion 22 and the respective wires 12 is also suppressed. Particularly, in this embodiment, not only the upper and lower flat surfaces 86, 86 of the outer peripheral surface of the wire holding portion 22, but also the lower curved surfaces 89, 89 and the left and right flat surfaces 88, 88 contact the curved surfaces 132, 132 and the vertical surfaces 134, 134 of the inner peripheral surface of the accommodating portion 124. Thus, the wire holding portion 22 is more stably sandwiched between the wire pressing portion 26 and the shield shell 24.

<Modifications>

Although the embodiment has been described in detail above as a specific example of the present disclosure, the present disclosure is not limited by this specific description. The present disclosure include modifications, improvements and the like within a range in which the aim of the present disclosure can be accomplished. For example, the following modifications of the embodiment are also included in the technical scope of the present disclosure.

(1) Although the wire holding portion 22 is composed of two members including the upper and lower first and second holding portions 96, 98 in the above embodiment, a wire holding portion may be, for example, composed of three or more members. When being composed of three members, a wire holding portion may be composed of a member for covering a left wire from the left, a member provided between the left and right wires and a member for covering the right wire from the right, and the wire holding portion composed of these three members may be arranged in an accommodating portion while covering and holding the respective wires. Note that, if the wire holding portion is composed of three members, recesses and protrusions for coupling the respective members may be provided as appropriate. Further, even if a wire holding portion is composed of two members, a protrusion (fitting protrusion 110 in the embodiment) and a recess (fitting hole 112 in the embodiment) need not be provided in lateral centers of first and second holding portions and may be provided on circumferential end surfaces of halved tubular portions on both left and right sides.

(2) Although the two wires 12, 12 are provided in the above embodiment, one, three or more wires may be provided.

(3) Besides the form in which first and second holding portions are separate bodies as in the above embodiment, a wire holding portion may be structured such that end parts of first and second holding portions on one side are coupled by a hinge. In this case, the first and second holding portions can be opened and closed about the hinge. Wires can be held by the wire holding portion by fixing end parts of the first and second holding portions on the other side to each other after the first and second holding portions are opened and the wires are sandwiched therebetween.

(4) Although both of the tubular parts 90, 90 of the wire holding portion 22 for surrounding the wires 12,12 have a hollow cylindrical shape in the above embodiment, those may have, for example, a rectangular tube shape.

(5) Although the press-contact ribs 114 are provided on both the inner peripheral surfaces of the first recesses 106 in the first holding portion 96 and the inner peripheral surfaces of the second recesses 108 in the second holding portion 98 in the above, the press-contact ribs may be provided in either one of the holding portions or may not be provided. Even if the press-contact ribs are provided, the press-contact ribs are not limited to those having a semi-annular shape and an arbitrary shape such as a projection shape, a shape extending in the axial direction of the wires and a spiral shape can be adopted. Further, the press-contact ribs in the first holding portion and those in the second holding portion need not be provided at the same positions in the front-rear direction and may be provided at positions different in the front-rear direction.

(6) Although the connector housing 16 and the shield shell 24 are fixed by tightening the bolts 164 in the above embodiment, engaging protrusions and engaging frame bodies engageable with each other may be, for example, provided and a connector housing and a shield shell may be fixed by engaging these.

(7) The shape of the connector housing 16 described in the above embodiment is merely illustrative, and the shape of a connector housing is not limited. Although the substantially box-shaped connector housing 16 for accommodating the terminals 18 is configured by assembling the housing lid portion 38 and the housing bottom portion 40 with the substantially tubular housing body 36 in the above embodiment, a substantially box-shaped connector housing for accommodating terminals may be configured, for example, by assembling a lid-like upper housing with a lower housing open upward.

LIST OF REFERENCE NUMERALS

10 connector
12 wire
14 wire pull-out opening
16 connector housing
18 terminal
20 projecting part
22 wire holding portion
24 shield shell
26 wire pressing portion
28 core wire
30 insulation coating
32 contact point portion
34 harness assembly
36 housing body
38 housing lid portion
40 housing bottom portion
42 front wall
44 rear wall
46 side wall
48 accommodating tube portion
50 waterproof rubber
52 insertion hole
54 bolt hole
56, 58 engaging protrusion
60 lid plate portion
62 tubular portion
64 communication hole
66 partition wall portion
68 engaging frame body
70 peripheral wall
72 tubular housing
74 holding tube portion
76 terminal assembly opening
78 engaging frame body
80 bottom plate portion
82 inserting portion
84 engaging frame body
86, 88 flat surface
89 curved surface
90 tubular part
92 coupling part
94 wire through hole
96 first holding portion
98 second holding portion
100 halved tubular portion
102 upper coupling portion
104 lower coupling portion
106 first recess
108 second recess
110 fitting protrusion
112 fitting hole
114 press-contact rib
116 bottom wall portion
118 front wall portion
120 rear wall portion
122 side wall portion
124 accommodating portion
125 connector housing recess
126 bottom part
128 side part
130 flat surface
132 curved surface
134 vertical surface
136 retaining wall portion
137 recess
138 bolt hole
140,142 bolt hole
144 bolt insertion hole
146 external connecting portion
148 pressing wall portion
150 pressing surface
152 bolt insertion hole
154 supporting portion
156 tubular portion
158 wire insertion hole
160 connector body
162,164 bolt

What is claimed is:

1. A connector, comprising:

a connector housing including a wire pull-out opening;

a terminal accommodated in the connector housing;

a wire connected to the terminal, the wire being pulled out to outside of the connector housing through the wire pull-out opening;

a wire holding portion made of synthetic resin, the wire holding portion holding a projecting part of the wire by being externally fit to the projecting part adjacent to the wire pull-out opening and projecting outward through the wire pull-out opening;

a shield shell made of metal, the shield shell covering the connector housing by being fixed to the connector housing; and a wire pressing portion made of metal, the wire pressing portion being bolt-fastened to the shield shell while sandwiching the wire holding portion between the shield shell and the wire pressing portion in a first direction intersecting an axial direction of the wire, the shield shell including an accommodating portion to be contacted by an outer peripheral surface of the wire holding portion, the wire pressing portion having a pressing surface for pressing the outer peripheral surface of the wire holding portion toward the accommodating portion in the first direction, and a gap being formed between the outer peripheral of the wire holding portion and the shield shell over an entire length in the axial direction around a part of the outer peripheral surface pressed by the pressing surface.

2. The connector of claim 1, wherein:

the wire holding portion includes a first holding portion and a second holding portion constituting the wire holding portion by sandwiching and holding the wire from both sides in a direction orthogonal to an axis of the wire and being assembled with each other, a first recess configured to accommodate the wire and contact an outer peripheral surface of the wire is open in a contact surface of the first holding portion with the second holding portion, a second recess configured to accommodate the wire and contact the outer peripheral surface of the wire is open in a contact surface of the second holding portion with the first holding portion, the first and second recesses are connected to configure a wire through hole when the first and second holding portions are assembled, and an outer peripheral surface shape of the wire holding portion is a rectangular shape.

3. The connector of claim 2, wherein:

the wire pressing portion includes a supporting portion for covering the wire holding portion from outside, and the supporting portion includes a wire through hole, the wire being inserted through the wire through hole.

4. The connector of claim 3, wherein:

the pressing surface of the wire pressing portion and a facing surface facing the pressing surface in the first direction in the accommodating portion of the shield shell are flat surfaces, and parts of the outer peripheral surface of the wire holding portion to be brought into contact with the pressing surface and the facing surface facing the pressing surface are flat surfaces extending in parallel to the pressing surface and the facing surface.

* * * * *